United States Patent [19]

Miller et al.

[11] Patent Number: 4,759,782
[45] Date of Patent: Jul. 26, 1988

[54] COALESCING FILTER FOR REMOVAL OF LIQUID AEROSOLS FROM GASEOUS STREAMS

[75] Inventors: John D. Miller, Ithaca, N.Y.; Evan E. Koslow, Westport, Conn.; Kenneth M. Williamson, La Fayette, N.Y.

[73] Assignee: Pall Corporation, Glen Cove, N.Y.

[21] Appl. No.: 62,516

[22] Filed: Jun. 16, 1987

Related U.S. Application Data

[63] Continuation-in-part of Ser. No. 751,953, Jul. 5, 1985, Pat. No. 4,676,807.

[51] Int. Cl.$^4$ .............................................. B01D 50/00
[52] U.S. Cl. ........................................ 55/487; 55/527; 55/528; 55/498; 55/524; 55/DIG. 25; 210/DIG. 5; 210/489; 210/505
[58] Field of Search ................. 55/97, 486, 487, 498, 55/527, 528, 524, DIG. 25; 210/489, 505, DIG. 5

[56] References Cited

U.S. PATENT DOCUMENTS

| | | | |
|---|---|---|---|
| 3,107,986 | 10/1963 | Plaut et al. | 55/97 |
| 3,250,059 | 5/1966 | Vosseller | 55/97 |
| 3,708,965 | 1/1973 | Domnick | 55/488 |
| 3,794,583 | 2/1974 | Rhodes | 210/23 |
| 4,050,237 | 9/1977 | Pall et al. | 55/486 |
| 4,086,070 | 4/1978 | Argo | 55/97 |
| 4,160,684 | 7/1979 | Berger et al. | 55/487 |

FOREIGN PATENT DOCUMENTS

| | | | |
|---|---|---|---|
| 0043774 | 1/1982 | European Pat. Off. | |
| 1345155 | 1/1974 | United Kingdom | 55/487 |
| 2017530 | 10/1979 | United Kingdom | |
| 2017774 | 10/1979 | United Kingdom | |
| 2084897 | 4/1982 | United Kingdom | 55/486 |

*Primary Examiner*—Bernard Nozick
*Attorney, Agent, or Firm*—Leydig, Voit & Mayer

[57] ABSTRACT

A coalescing filter capable of removing liquid aerosols (such as water and oil) from gaseous streams with high efficiency. The filter comprises three layers, (a) an intermediate fibrous layer having a pore size of from about 1.25(t) to about 2(t), where t is the dynamic film thickness of the aerosol in the gaseous stream, the fibers of the intermediate fibrous layer having diameters ranging from about 0.1 to about 20 micrometers, (b) a fibrous layer upstream of the intermediate layer having a pore size greater than the intermediate layer, and (c) a downstream fibrous layer having a pore size greater than the intermediate layer and wherein the critical surface energy of each layer of the filter is less than the surface tension of the liquid making up the aerosol.

5 Claims, 2 Drawing Sheets

COALESCING FILTER FOR REMOVAL OF LIQUID AEROSOLS FROM GASEOUS STREAMS

This application is a continuation-in-part of U.S. Ser. No. 751,953, filed July 5, 1985 now U.S. Pat. No. 4,676,07 entitled "Process for Removal of Liquid Aerosols From Gaeous Streams".

TECHNICAL FIELD

This invention is related to coalescing filters. In particular, it is directed to high efficiency coalescing filters for removal of liquid aerosols from gaseous streams.

BACKGROUND ART

Coalescing filters are used for a variety of applications. In general, gas coalescers serve to remove aerosol contaminants, both liquid and solid, from gaseous streams, for example, in purifying compressed gases such as air, helium, hydrogen, nitrogen, carbon dioxide, and natural gas, and in filtering inert gases used in recovering oil. They also may be used to collect liquid aerosol contaminants, such as in the filtering of vacuum pump exhausts where they serve to both prevent contamination of the environment and reclaim expensive vacuum pump oil. Similarly, they may be used in filtering chemical mists from low pressure chemical process streams to prevent pollution by, and to reclaim, liquid chemical aerosols.

Typically, coalescing filters are relied upon to remove the most difficult to separate aerosols. For example, oil lubricated compressors are widely used for compressing gases. Such compressors produce aerosols as a result of mechanical shearing and a combination of oil vaporization and subsequent downstream condensation. The aerosols formed generally comprise particles ranging in size from about 0.01 to about 50 micrometers.

Water aerosols are formed when the intake gas to a compressor contains sufficient water vapor that the resulting compressed and cooled gas exceeds 100 percent relative humidity. This commonly occurs, e.g., when the intake gas is atmospheric air or when the gas to be compressed is process gas that has come in contact with water.

Highly hydrophobic filters, also referred to as "barrier filters", are sometimes used to remove water-based aerosols of relatively large particle size from gas streams. These filters work by preventing water from passing through the filter medium by trapping the water-based aerosols on the upstream surface of the medium. The pores of such barrier filters must be smaller than the aerosol particles being removed. Accordingly, they are not efficient for removal of small aerosol particles since the pressure drop would be prohibitive.

Larger aerosol particles (larger than about 0.6 micrometers) tend to impinge and coalesce on surfaces throughout piping systems because their momentum often is too great to follow the flow path. These larger particles may be removed and, for economic reasons, generally are removed by other separating means, e.g., after-coolers and centrifugal separators or demisters. Coalescing filter elements, however, typically must be relied upon to remove aerosol particles ranging in size from about 0.1 to about 0.6 micrometers. Such aerosols are considered to be the most difficult to separate because they display marginal impactive removal and do not have sufficient diffusional characteristics to divert from system flow to allow interaction with separating devices. Smaller aerosol particles, e.g., less than about 0.1 micrometer, typically can be removed with somewhat coarser filters because they rapidly diffuse to surrounding surfaces.

Whether or not other separating means are used, coalescing filters conventionally are designed with well-known principles in mind. For a coalescing filter having a given voids volume, and for a gaseous stream having a given flow rate and aerosol loading, the filtering efficiency generally increases as the pore size decreases and/or the thickness of the filter medium increases. Decreasing pore size and/or increasing filter medium thickness, however, increases the pressure drop across the medium and, thereby, the energy required to maintain a given flow rate. With a given volume or space constraint, e.g., a filter cartridge of specified size, the use of a thicker filter medium will generally result in limiting available filter surface area, an increase in overall flow velocity, and correspondingly higher flow resistance. Increased flow velocity through the filter also decreases separation efficiency for the difficult-to-remove-size aerosol particles.

In the past, coalescing filter media have been designed to trade-off and optimize these competing factors. Many filter media so designed offer good performance under dry conditions. Eventually, however, the medium accumulates liquid as a result of collecting liquid aerosol particles. The accumulated liquid tends to block the smaller pores and thereby reduce the filtering efficiency of the medium. Blocked pores also increase the pressure drop across the medium which, in turn, increases energy requirements.

Conventional coalescing filters not only exhibit reduced efficiency and increased pressure drops when wet, they also tend to produce secondary aerosols. These can be formed by two mechanisms. As the smaller pores are blocked, the velocity of gas through the larger unblocked pores increases. The increased velocity increases the likelihood of shearing liquids from the surface of the filter medium and forming secondary aerosols downstream of the filter. Additionally, as the coalesced liquid flows down the filter, it can form a film over the pores. Gas passing through the filter tends to expel the liquid by forming bubbles which burst, forming secondary aerosols downstream of the filter. In short, the overall performance of the filter medium suffers when wetted.

At least some solid particulate matter is generally present in gaseous streams being treated for removal of liquid aerosols. Such dirt may be associated with the gas to be filtered or can arise as a result of wear and corrosion of the system apparatus. This solid particulate matter will also block pores in the filter medium and contribute to increased pressure drop.

For the most efficient separation of entrained aerosols from a gas stream then, a high performance coalescing filter should have the following characteristics:

(1) a high separation efficiency for aerosols having a particle size of from about 0.1 to about 0.6 micrometers over a wide range of influent concentrations, (as noted, these aerosols are considered to be the most difficult to separate);

(2) a low pressure drop (flow resistance) under wet conditions since flow resistance should be minimized in order to reduce energy losses;

(3) the ability to continue effective operation when handling and collecting liquid aerosols, while avoiding secondary aerosol formation downstream of the filter by virtue of shearing forces as the gas passes through the filter or by the "blowing of bubbles" as the pores are bridged by the coalesced fluid and subsequently blown out under the pressure of gas passing through the filter; and (4) a high dirt-holding capacity to accommodate solids accumulation, while retaining low pressure drop, i.e., a coalescing filter must be able to handle effectively the dirt-loading which may result from the intake of particles resulting from corrosion and wear which may be released into the gas stream being filtered.

In order to evaluate the liquid aerosol separation efficiency and saturated pressure drop (ΔP) of high efficiency coalescing filter media, Pall Corporation developed a test method described in detail in its November 1984 publication *PEDD-FSR 101a* entitled "Field Report 101, Practical In-Service Simulation Tests For The Rating Of High Efficiency Aerosol Coalescing Filter Performance".

The subject invention is directed to coalescing filters which maintain high efficiency and low pressure drop even when operating under wet conditions and which in large measure have the characteristics (1)–(4) set out above.

DISCLOSURE OF THE INVENTION

This invention is directed to coalescing filters capable of removing water aerosols or oil aerosols from gaseous streams with high efficiency. The filters comprise three layers, (a) an intermediate fibrous layer having a pore size such that the dynamic film thickness (t) of water is from about 0.5 D to about 0.8 D, where D is the pore size of the intermediate fibrous layer, the fibers of the intermediate fibrous layer having diameters ranging from about 0.1 to about 20 micrometers, (b) a fibrous layer upstream of the intermediate layer having a pore size greater than the intermediate layer, and (c) a downstream fibrous layer having a pore size greater than the intermediate layer. The critical surface energies of each layer of the filter for removing water aerosols are less than the surface tension of water. The critical surface energies of each layer of the filters for removing oil aerosols are less than the surface tension of oil.

In operation, the correlation of the pore size with the dynamic film thickness of the liquid coupled with the relationship between the surface tension of the liquid and the critical surface energy of the porous medium provide high efficiency removal of the liquid aerosols with a minimum resistance to flow even when wet. The effluent typically contains 0.05 ppm or less, by weight, of aerosol.

BEST MODE FOR CARRYING OUT THE INVENTION

Figure 1:
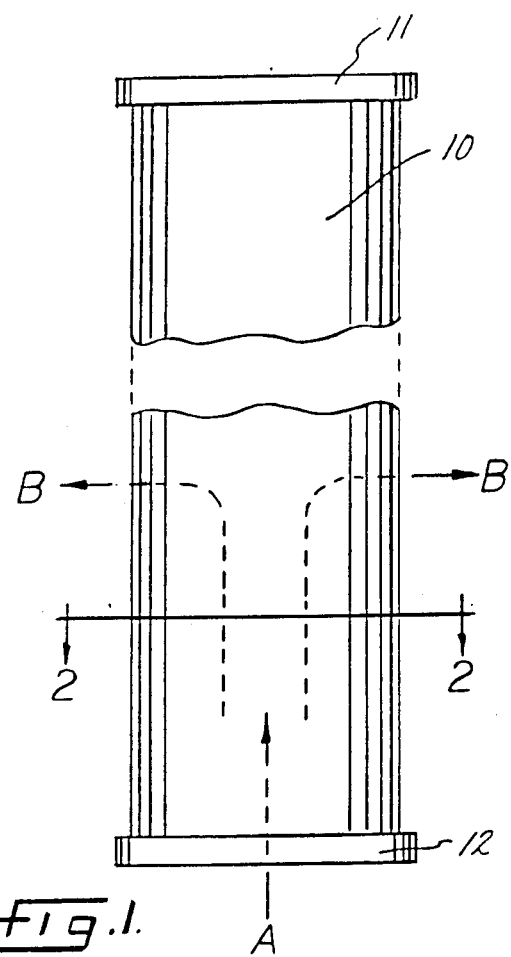
FIG. 1 is a side view of a cylindrical filter element of conventional design.

Before describing the invention in more detail below, certain terms used herein need to be defined.

Definitions:

As used herein, the term "critical surface energy" of the porous medium ($\gamma sl$) is defined as the energy required to wet a unit of surface (at equilibrium), displacing the gas phase present. It can be represented:

$$\gamma sl = \gamma sg - \gamma lg \, (\cos \theta)$$

where $\theta$ = the three-phase contact angle in degrees,
 $\gamma sg$ = solid energy of cohesion relative to the gas, and
 $\gamma lg$ = the surface tension of the liquid relative to the gas phase.

As used herein, the term "surface tension" of the liquid to be removed is defined as the energy required to generate a unit area of surface displacing the system gas, i.e., relative to the gas phase. This can be determined by a conventional method, e.g., the ring-pull method.

As used herein, the term "dynamic film thickness" of the liquid to be removed is defined as the maximum thickness of the liquid in the medium pores where the energy required to divert the gas stream around the liquid is less than the energy required to overcome the adhesion and frictional interactions to move the liquid. The dynamic film thickness can be determined (in laminar flow) from the relationship:

$$\gamma lg \cdot (1 + \cos\theta)/\mathrm{Tan}\,(\theta/2) = KQ\mu t^2/g_c(D-t)^4$$

where
 K is a constant equal to $128/\pi$,
 Q is the volumetric flow in cubic centimeters per second,
 D is the pore diameter (size) in centimeters,
 $\mu$ is the absolute viscosity in poise
 t is the dynamic film thickness of the film in centimeters,
 $\theta$ is as defined above; and
 $g_c$ is the gravitational dimensional constant (equal to 1 for a gram/centimeter/second system).

As used herein, the term "pore size" of the filter medium is defined as the mean or average equivalent diameter of the flow channel between the medium surfaces or opposing walls of the structure making up the medium, e.g., the mean or average distance between fibers when a fibrous filter structure is used. This is analogous to the hydraulic radius treatment for an irregular-shaped channel for fluid flow. For best results, the distribution about the mean pore size should be relatively narrow in a given filter layer.

As used herein, the term "high efficiency" is defined as the removal of the particular aerosol to a level below 0.05 ppm by weight in the effluent. For oil-based aerosols, the measurement of the aerosol content in the filtrate is carried out using the method disclosed in the publication *PEDD-FSR 101a* referred to above.

Filter Media

Coalescing filters in accordance with the subject invention preferably comprise porous fibrous media. The filters in accordance with the subject invention may have constant pore size or tapered pore sizes, and they may be composite structures comprising multiple filter medium layers and/or multiple support layers. At least one of the layers of the filter media is designed so that the dynamic film thickness (t) of the liquid to be removed is from about 0.5 D to about 0.8 D (where D is the pore diameter as defined above). Typically, the pore size of this layer (or layers) will be from about 1 to about 5 micrometers when used to filter oil-based aerosols. For the removal of water-based aerosols, the pore size will typically be in the range of from about 1 to about 20 micrometers, more preferably from about 4 to about 20 micrometers. Resistance to flow is much lower than with conventional coalescers under the same conditions, e.g., on the order of 20 to 50 percent of conventional coalescers, e.g., from about 0.1 to about 2.0 pounds per square inch differential (psid) or less, or, at equal pressure drops, much higher flow rates can be obtained. For all layers of the filter medium, as well as any drainage and support layers, the dynamic film thickness of the liquid to be removed should be at least 0.5 D. Additionally, the filter medium must have the defined critical surface energy, i.e., be lower than the surface tension of the liquid to be removed. Preferably, the entire structure that comes in contact with the gas being filtered has the defined critical surface energy, including the support layers and, in the case of a filter cartridge, the end caps. To obtain the desired surface properties, it may be necessary to modify some or all layers of the filter medium, as described in greater detail below, by the use of surface-modifying agents to provide the requisite critical surface energy.

Fibrous filter media in accordance with the subject invention may be made from organic or inorganic fibers. Exemplary organic microfibers include those made from polyolefins, for example, polyethylene, polypropylene, polymethylpentane, polyisobutylene, and copolymers thereof, for example, ethylenepropylene, polyesters, for example, polybutylene terephthalate and polyethylene terephthalate, and polyamides, for example, polyhexamethylene adipamide (nylon 66), polyhexamethylene sebacamide (nylon 610), nylon 11 (prepared from 11-amino-nonanolic acid), and homopolymers of poly-e-caprolactam (nylon 6), and mixtures or blends of such polymers. The microfibers may be made of other polymers which can be formed into microfibers, and mixtures of microfibers also can be used. Exemplary inorganic fibers include those made from glass and metal titanates, e.g., potassium titanate.

The fibers generally will have diameters of from about 0.1 to about 20 micrometers, although finer or coarser fibers may be used. The fibers may vary in length from relatively short staple-like microfibers of about 0.5 inch or less up to substantially continuous filaments several feet or more in length. Typically, the median length to diameter ratio of the fibers (aspect ratio) will be in the range of from 500 to 1,000.

Potassium titanate fibers are available from commercial manufacturers, such as Otsuka Chemical Company, Ltd. (Japan) and E. I. DuPont de Nemours and Company. Suitable glass fibers are available from commercial manufacturers, such as PPG Industries, Johns-Mansville, Inc., and Owen-Corning Fiberglass Corporation, as well as other manufacturers.

Porous fibrous media, particularly inorganic fibrous media, may be prepared from a slurry of the fibers and a suitable binder. The slurry typically is cast or drawn by a vacuum onto a screen and then dried and cured. Where the fibers are composed of thermoplastic organic polymers, the fibrous media may be made by a melt-blown process, as described in the literature, for example, in 48 (No. 8) *Industrial and Engineering Chemistry*, 1342–46 (1956), and V. White, *The Manufacture of Superfine Organic Fibers*, (U.S. Department of Commerce, Naval Research Laboratory, Publication PB111437, 1954).

The material of which the media is primarily composed may be selected so that the resulting media will have surface properties within the scope of this invention. Generally, however, it may be less expensive and more expeditious simply to modify commercially available coalescing filter media. It also may be desirable in that structural, non-shedding, and other beneficial features of media may be achieved where the component materials otherwise would not produce a medium having the defined surface energies. The surface properties of conventional coalescing filter media may be modified by any of a number of well-known surface-modifying or treating agents.

The treating agent used to provide the structures of this invention with the requisite critical surface energy can be any treating agent which imparts the requisite properties. The preferred fluorochemicals can have varied chemical structures, see, for example, U.S. Pat. No. 3,489,148 and the patents cited therein at column 4. Particularly preferred compositions contain perfluorinated fluorochemicals. These type materials are available from Minnesota Mining and Manufacturing Company under the designations FC-721, FC-807, FC-809, and FC-824. The actives in FC-807 and FC-809 are described in detail in the Federal Register, Volume 37, Number 96, at pages 9762–9763. Specifically, they are liquid-based compositions containing as the active solids a minimum of about 40 percent of ammonium bis(N-ethyl-2-perfluoroalkylsulfoamideoethyl) phosphates wherein the alkyl group is more than 95 percent $C_8$ and the fluorine content is from 50.1 to 52.8 percent by weight. FC-824 is a perfluoroacrylate copolymer. These treating materials are preferably applied in the form of a dilute mixture comprising, e.g., 7 parts by volume of water, 0.5 parts by volume of diethylene glycol monobutyl ether (available from Union Carbide Corporation under the trademark BUTYL CARBITOL) as a fugitive wetting agent, and 2.5 parts by volume of the fluorochemical treating agent (which typically will contain 40 percent by weight solids or more). The 2.5 parts by volume referred to above is based on the total volume of the fluorochemical treating agent, e.g., FC-824, as received from the manufacturer. To prepare the dilute treating mixture, the water and diethylene glycol monobutyl ether should be premixed and the fluorochemical treating agent slowly added to this first mixture with mixing. Another preferred treating agent is Florad FC-721, a clear mobile solution of a fluoropolymer similar to a fluorinated methacrylate polymer. FC-721 is preferably applied to the filter structure to be treated by diluting 2 parts by weight of the material as provided, i.e., a 2 weight percent solids or actives dissolved in Freon TF (trifluorotrichloroethane), with 198 parts by weight of Freon TF. This dilute composition is then applied to a filter medium or structure by any of the methods described below.

The surface-modifying agent may be applied to a filter medium or preformed structure, e.g., a filter cartridge, by a post-treatment of the formed medium or structure, for example, by dipping it, spraying it, roller coating it, or otherwise contacting the preformed medium or structure with a solution or dispersion of the surface-modifying agent. In the case of a fibrous filter media prepared from a slurry of fibers, the surface-modifying agent may be admixed into the slurry prior to laydown and formation of a filter medium.

After the composite medium has been treated, e.g., by impregnation, spraying or roller coating the dilute treating agent onto the structure, it is then dried.

After treatment, the filter medium, if it is to be used in filtration of oil aerosols, should yield a minimum contact angle of about 100, and preferably a contact angle of between about 100 and about 140, degrees with mineral oil when measured by the Sessile Drop Method. This known method involves the measurement of the tangent angle of a stationary drop of oil resting on a flat surface of the medium being tested by means of a microscope. In like manner, if the filter medium is to be used to filter water aerosols, a minimum contact angle of about 100, and preferably a contact angle of between about 100 and about 140, degrees with water should be obtained.

Filter Structures

The coalescing filter structures can take a variety of forms including those of conventional coalescing filter structures, for example, discs, flat panels, and pleated or unpleated cylinders. They may also comprise simple or composite media. As depicted in FIG. 1, a preferred filter element comprises a cylindrical filter structure 10 and end caps 11 and 12. As illustrated by arrows A and B, in the embodiment shown in FIG. 1 the gaseous stream passes through an opening (not shown) in the end cap 12 into the interior of the cylindrical element and, since the end cap 11 is solid, the gaseous stream passes through the filter structure 10 to the exterior. The filter element depicted in FIG. 1 (comprised of the filter structure 10 and end caps 11 and 12) may be enclosed within a housing (not shown) wherein the aerosol which coalesces on the filter structure 10 is carried down the outer side of the filter structure by gravity to a sump or collector at the bottom.

Figure 2:
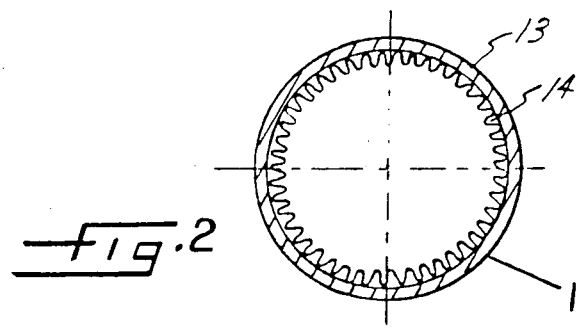
FIGS. 2, 2a and 2b are cross-sectional views along line I—I of various preferred filter structures suitable for use in filter elements of the type depicted in FIG. 1.

As illustrated in FIG. 2, the filter structure 10 may comprise a single pleated filter medium 14 supported by an outer perforated support cage 13.

Figures 2A, 2B:
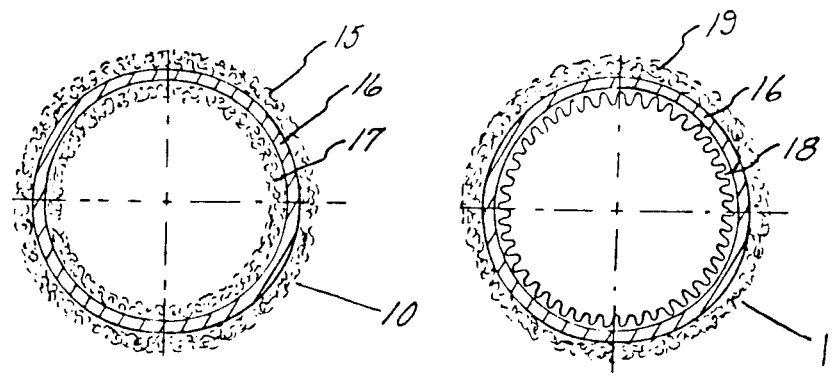
Figure 3:
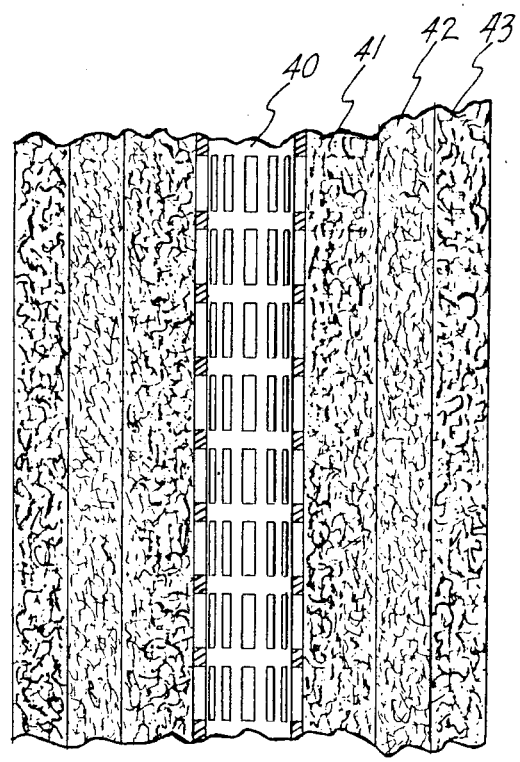
FIG. 3 is a partial cross-sectional view of a cylindrical filter element of the general type disclosed in FIG. 1 taken along an axial plane of the element.

Alternatively, as shown in FIG. *2a*, the filter structure 10 may comprise an outer coarse filter medium 15 which acts to trap solid particulates, a perforated support cage 16 and an inner filter medium 17. Filter media 15 and 17 in the preferred embodiment structures depicted in the drawings are fibrous media of the type described above. In this configuration, however, the outer medium 15 preferably has a relatively large pore size, and the inner medium 17 preferably has a tapered pore structure from relatively large to relatively small and then back to relatively large; the first large pore portion to provide dirt capacity, the intermediate small pore portion for efficient aerosol removal, and the second large pore portion to aid in coalescence.

As illustrated in FIG. *2b*, another embodiment in accordance with the invention comprises a pleated inner medium 18, an intermediate support cage 16, and an outer, coarse filter medium 19. In this configuration as well, the pleated inner medium 18 preferably has a tapered pore structure from coarse to fine and back to coarse.

Another example of an inside/out filter element configuration is illustrated in FIG. 3. In this filter element there are three filter layers over the perforated support core 40:

(a) an inner coarse fibrous layer 41 over the perforated support core 40, preferably having a tapered pore structure from larger to finer in the direction of flow, to trap solids particulates, (b) an intermediate fibrous layer 42 of finer pore size for aerosol removal, preferably having pore sizes in the range of from about 1 to about 5 micrometers when used to filter oil-bases aerosols and from about 1 to about 20 micrometers when used to filter water-based aerosols, and (c) an outer coarse fibrous layer 43 to aid in aerosol coalescence.

A variety of coalescing filter media but a variety of coalescing filter structures, as well as a variety of coalescing filter media, are suitable. Preferably, however, not only the filter media but all parts of the filter structure, e.g., a filter cartridge or element including any end caps, support cage, or core, have critical surface energies less than the surface tension of the liquid to be removed, whether as a result of appropriate selection of the composite materials or of treatment to modify the surface properties.

The best mode for carrying out the invention will be further described by reference to the following examples.

EXAMPLE 1

A composite, cylindrical pleated filter structure consisting of four oleophobic layers and having pleats 0.285 inch deep, a total of 60 corrugations, a length of 9.5 inches, and having an effective filter surface area of 1.15 square foot was prepared from two layers of melt-blown polyester fibrous material with two glass fiber layers sandwiched therebetween. The melt-blown polyester fibrous layers were identical and were comprised of fibers having diameters ranging from about 35 to about 50 micrometers. The melt-blown polyester fibrous material had a flat sheet weight of 1.35 grams per square yard and was calendered to a thickness of 0.009 inch prior to being combined with the glass fiber medium. The calendered material had a and pore size of about 100 micrometers. The intermediate glass fiber layers were comprised of epoxy bonded glass fibers ranging in diameter from about 0.2 to about 1.6 micrometers. The glass fiber layers each had a flat sheet weight of 8.9 grams per square foot and was about 0.02 inch thick with pore sizes in the range of from about 1 to about 5 micrometers, treated with 2.5 parts by weight FC 824, 7 parts by weight water, and 0.5 parts by weight Butylcarbitol gas. The pleated composite filter structure was placed inside an open, perforated polypropylene cage and a polypropylene web was air-laid around the perforated cage. The thickness of this outer web was about 0.25 inch. The fibers in the outer wrapped web had diameters ranging from about 20 to about 30 micrometers. The pore size was about 1,000 micrometers. The resulting structure had a cross-sectional configuration as depicted in FIG. *2b* with the pleated medium 18 made up of four layers, as described.

The polypropylene web and cage described above was given an oleophobic post-treatment comprising saturating the component with a 0.04 weight percent Florad FC-721, i.e., four parts by weight of the material as received was diluted with 196 parts by weight of Freon TF. After vacuum application to remove excess treating material, the structure was dried at ambient conditions. The resulting structure had a minimum contact angle of 130 degrees with mineral oil when measured by the Sessile drop method, i.e., the measurement of the tangent angle of a stationary drop of the oil resting on a flat surface by use of a microscope.

9

The described filter element or cartridge having the same cross-sectional configuration as depicted in FIG. 2b was prepared. The various layers making up the filter structure (presented in an outside basis) and their characteristics are set out in Table 2 below.

The filter element was tested by the method described in PEDD-FSR 101a using, as the challenge, an oil aerosol derived from Mobil DTE 24 oil with a weight concentration of the aerosol in the influent gas stream of 135 ppm by weight. An average flow rate of 88 SCFM, an average pressure of 55 psig and an average temperature of 68 degrees Fahrenheit was used. The concentration of the oil in the effluent was 0.0025 ppm by weight. The clean filter element had a pressure drop ($\Delta P$) of 0.488 psid. Its saturated pressure drop was 1.13 psid. The clean assembly pressure drop was 0.788 psid and the loaded or saturated assembly pressure drop was 1.43. A performance number of 181 was obtained (about twice that of conventional coalescers of the same configuration).

Corrected to a pressure of 100 psig and a temperature of 100 degrees Fahrenheit, a flow rate of 153.8 SCFM, a clean filter pressure drop of 0.024 psid, a saturated pressure drop of 1.18, and a loaded or saturated assembly pressure drop of 1.7 psid were obtained together with a performance number of 148.

EXAMPLE 2

Two identical, composite, cylindrical pleated filter structures having pleats 0.4 inches deep, a total of 56 corrugations, 9.25 inches in length, and having an effective filter surface of 2.88 square feet were prepared from (in the direction of flow, i.e., inside out) seven layers of melt-blown polyester fibrous material having fibers ranging in diameter from 35 to 50 micrometers and a pore size of about 100 micrometers, with each layer calendered to 0.004 inches in thickness and having a flat sheet density (weight) of 0.5 ounces per square yard, followed by one layer of a phenolic bonded glass fiber medium with fibers ranging from 0.2 to 1.6 micrometers and having a flat sheet weight of 2.7 grams per square foot and a thickness of about 0.01 inches with the pore sizes ranging from 1 to about 5 micrometers, followed by a melt-blown polyester fibrous layer with fiber diameters ranging from about 35 to about 50 micrometers, a flat sheet weight of 2.1 ounces per square foot and a pore size of about 100 micrometers.

One filter was treated with FC-721 as described in Example 1 above. Both the treated and untreated filters then were tested at air velocities of 4 and 8 feet per minute with a water aerosol at a concentration of 740 ppm at a system operated pressure of 30 psig. The results are shown in Table 2 below.

TABLE 2

| Car-Tridge | | Air Velocity (ft/min) | $\Delta P$ (dry) (psid) | $\Delta P$ (equilibrium) (psid) |
|---|---|---|---|---|
| 1 | Untreated | 4 | .105 | .596 |
| 1A | Treated | 4 | .102 | .112 |
| 2 | Untreated | 8 | .293 | .773 |
| 2A | Treated | 8 | .291 | .340 |

As can be seen from the table, the untreated filter structures had much higher pressure differentials under the test conditions than did the treated filter structures.

EXAMPLE 3

Two identical, composite pleated filter structures having pleats 0.345 inch deep, a total of 35 corrugations, 9.25 inches in length, 3.70 inches in diameter, and having an effective filter surface area of 1.34 square feet were prepared from (in the direction of flow, i.e., inside-out) an 18×14 woven steel mesh (0.071 inch wires), a melt-blown polyester fibrous material having fibers ranging in diameter from 35 to 50 micrometers and a pore size of about 100 micrometers, a thickness of about 0.012 inch, and a flat sheet weight of 2.1 ounces per square yard, two layers of phenolic-bonded glass fiber medium with fibers ranging from 0.2 to 1.6 micrometers, each layer having a thickness of about 0.02 inch with pore sizes ranging from about 1 to about 5 micrometers, followed by another layer of melt-blown polyester with the same characteristics as those described above, and followed in turn by another 18×14 woven steel mesh (0.071 inch wire diameter).

The fine fiberglass medium layers each had a 0.053 foot/minute open bubble point of 33 inches of water, a flat sheet weight of 9 grams per square foot, and developed 3.3 inches of water pressure differential when subjected to a 28 feet per minute air flow at standard conditions.

On the exterior of each pleated portion of the cartridge was a perforated metal cage and an outer wrap composed of two layers of PVC bound polyester air laid bat material (having a weight of 4 ounces per square yard) compressed to approximately 3/16 of an inch thickness by a single outer layer of melt-blown polyester fibrous material having fibers ranging in diameter from 20 to 40 micrometers, a pore size of about 100 micrometers, a flat sheet thickness of 0.004 inch, and a flat sheet weight of 0.5 ounce per square yard.

The cartridges were assembled using an epoxy as the end cap and pack side seal adhesive. Following assembly, one of the two cartridges was treated with FC-721 in Freon TF in the manner described above under Example 1 except that the concentration of FC-721 was 0.01 weight percent.

The treated cartridge was tested using a Gardner-Denver Model ECHSJA 50 horsepower flooded screw compressor. In the testing procedure, the test separator cartridge was installed in the separator housing of the compressor system, as was the full flow sampler manifold (two samplers in parallel). During equilibration, the manifold valves were turned to flow through the sampler bypass. Heating mantles were placed around each full flow sampler and a thermocouple was inserted. The heat sampler's temperature controllers were subsequently set to the approximate system operating temperature to eliminate oil vapor condensation. The compressor and the water to the heat exchanger were activated, and the system operating pressure was set (tested at 100, 85, and 75 psig). The starting time was recorded, initially allowing 8 hours to equilibrate (2 hours to equilibrate in subsequent tests). The downstream sampler bypass valve was opened, followed by the upstream valve, to initiate sampling. The start-up time, recorded assembly $\Delta P$, each sampler $\Delta P$, line pressure and temperature, and rotameter flow parameters were recorded. After the desired sampling time (10 minutes for all tests), the upstream bypass valve was closed, followed by the downstream bypass valve. The heating mantles and thermocouple were then removed from the samplers, and pressure was released from the sampling line. The sampler manifolds and the full flow samplers were then removed, and the ends of each sampler were sealed. The next full flow sampler pair were then installed and the test run was repeated.

The results obtained with the treated cartridge are set out in Table 3 below.

TABLE 3

| Type of Test | Assembly P (psid) | Downstream Oil Con-Concentration (ppmw)* |
|---|---|---|
| 100 psig Full Load | 2.25 | 1.95 |
| 85 psig Full Load | 2.5 | 2.28 |
| 75 psig Full Load | 2.75 | 2.86 |
| 50 Hrs Continuous Operation 100 psig Full Load | 2.5 | 3.21 |

*ppmw is parts per million by weight

An attempt was made to subject the untreated cartridge to the same protocol. However, the test was terminated after 1 hour due to massive oil carryover in the system. The ΔP at cessation was 4 psid. Massive oil carryover was estimated at between 2,000 and 10,000 ppmw which is far beyond the accurate measurement range of the sampling technique used above. Oil was observed dripping from a previously unknown small leak in the test system at approximately 2 cc/hr (corresponding to about 115 ppmw).

The results of this comparative example graphically demonstrate the substantially enhanced results obtainable by coalescing filters in accordance with the subject invention. Filters in accordance with the subject invention allow the use of filters of substantially reduced size compared with those commonly used for a given job. For example, in the Gardner-Denver compressor used in the test runs of Example 3, filters in accordance with the subject invention which were only one-fifth the size will provide comparable performance (oil carryover and differential pressure) to that of the coalescer conventionally supplied with the compressor. When it is considered that the aerosol challenges to a coalescer in an oil flooded screw compressor are on the order of 100 to 4,000 times as great as those normally encountered with a high efficiency coalescer, the effectiveness of the filter of Example 3 in accordance with the subject invention is manifest. The data in Table 3 reflect approximately a 99.99 percent reduction in oil.

We claim:

1. A coalescing filter for the high efficiency removal of water aerosol from a gaseous stream, said filter comprising three layers, (a) an intermediate fibrous layer having a pore size of from about 1.25(t) to about 2(t), where t is the dynamic film thickness of the water aerosol in the gaseous stream, the fibers of said intermediate fibrous layer having diameters ranging from about 0.1 to about 20 micrometers, said intermediate layer having a pore size of from about 1 to about 20 micrometers, (b) a fibrous layer upstream of said intermediate layer having a pore size greater than said intermediate layer, and (c) a downstream fibrous layer having a pore size greater than said intermediate layer and wherein the critical surface energy of each layer of said filter is less than the surface tenison of water.

2. A filter cartridge comprising the coalescing filter of claim 1 and further including a core, support cage, and end caps.

3. A coalescing filter for the high efficiency removal of oil aerosol from a gaseous stream, said filter comprising three layers, (a) an intermediate fibrous layer having a pore size of from about 1.25(t) to about 2(t), where t is the dynamic film thickness of the oil aerosol in the gaseous stream, the fibers of said intermediate fibrous layer having diameters ranging from about 0.1 to about 20 micrometers, said intermediate layer having a pore size of from about 1 to about 5 micrometers, (b) a fibrous layer upstream of said intermediate layer having a pore size greater than said intermediate layer, said (c) a downstream fibrous layer having a pore size greater than said intermediate layer and wherein the critical surface energy of each layer of said filter is less than the surface tension of oil.

4. A filter cartridge comprising the coalescing filter of claim 3 and further including a core, support cage, and end caps.

5. The filter cartridge of claim 4 wherein all parts of said cartridge have critical surface energies less than the surface tension of oil.

* * * * *